United States Patent [19]

Dashevsky

[11] Patent Number: 5,004,155

[45] Date of Patent: Apr. 2, 1991

[54] AGRICULTURAL SPRAYER

[76] Inventor: Norm Dashevsky, General Delivery, Brunkild, Manitoba, Canada, R0G 0E0

[21] Appl. No.: 472,283

[22] Filed: Jan. 30, 1990

[51] Int. Cl.⁵ .............................................. B05B 9/00
[52] U.S. Cl. .................................. 239/127; 239/157; 239/310; 417/427
[58] Field of Search .................. 417/233, 427, 428; 239/124–127, 156, 172, 310, 155, 157, 10

[56] References Cited

U.S. PATENT DOCUMENTS 4,826,083  5/1989  Vanderjagt.

*Primary Examiner*—Andres Kashnikow
*Assistant Examiner*—Kevin Weldon
*Attorney, Agent, or Firm*—Murray E. Thrift; Stanley G. Ade; Adrian D. Battison

[57] ABSTRACT

An agricultural sprayer of the injection type has a charging circuit for generating a pressurized circulating flow of fluid additive. This is supplied to the inlet of a metering pump of the variable stroke piston type. This allows the pump to operate at optimum volumetric efficiency throughout a wide range of pump speeds, for agricultural chemicals of all common viscosities and at all temperatures normally encountered. The speed of the metering pump can thus be controlled to control the amount of chemical injected into the water being sprayed.

4 Claims, 5 Drawing Sheets

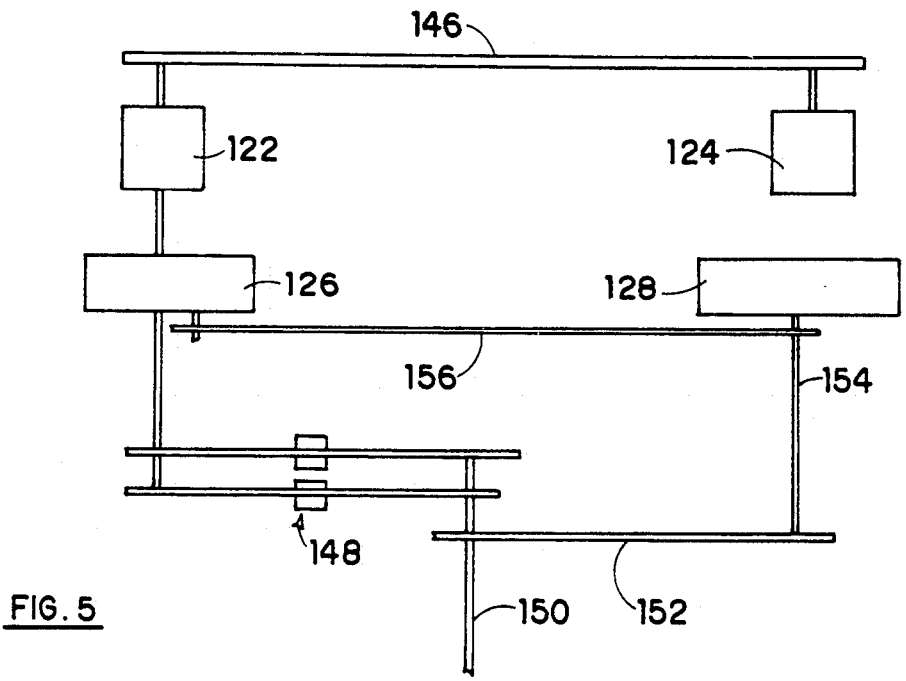
FIG. 5
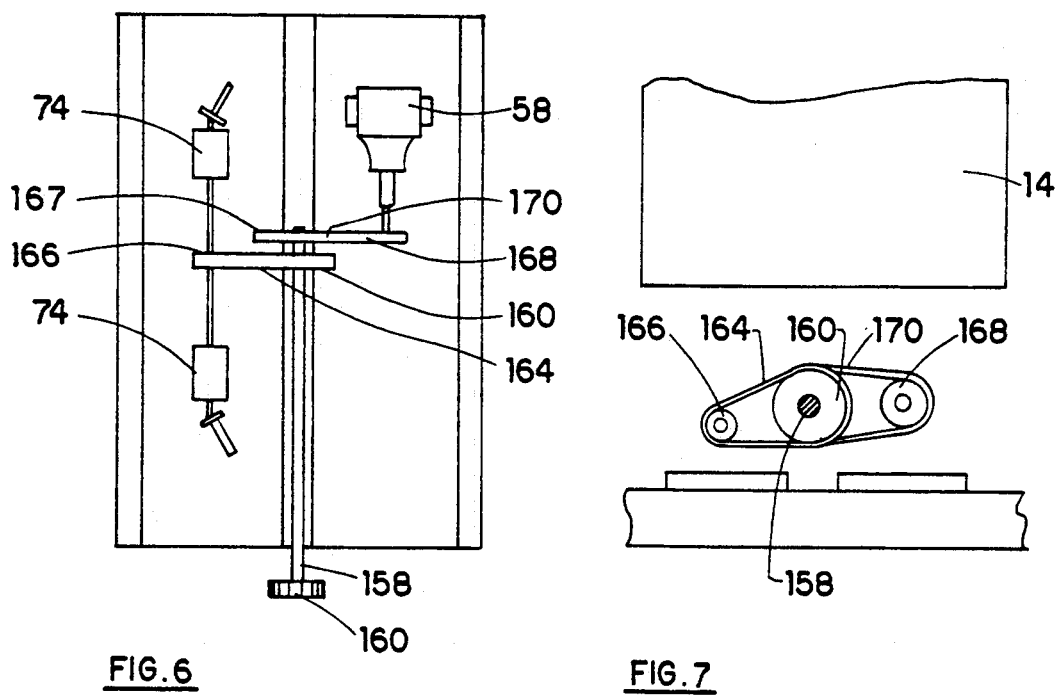
FIG. 6
FIG. 7

AGRICULTURAL SPRAYER

FIELD OF THE INVENTION

The present invention relates to agricultural sprayers and more particularly to injection sprayers.

BACKGROUND

An injection sprayer is a sprayer in which the carrier liquid, which may be water or a solution, mixture or suspension of another material in water, is fed to the spray nozzles of the apparatus from one supply, while an additive, for example a pesticide, is injected from another source into the water passing through the supply lines. This avoids the need to premix the additive and the carrier.

Various injector systems of this type have been proposed in the past. The known systems suffer from certain disadvantages, including the inability of the additive metering system to handle materials with widely varying viscosities, at widely varying temperatures and at different dilution rates.

The present invention is concerned with an improved apparatus of this type.

SUMMARY

According to the present invention there is provided a system for supplying measured quantities of fluid additive to a carrier liquid flow in an agricultural sprayer of the type having a carrier liquid tank, a spray boom assembly for spraying mixed water and additive onto a field, a supply line leading from the carrier liquid tank to the boom and carrier pump means for pumping carrier liquid through the supply line, said system comprising:
- an additive circulating circuit including circulating pump means, means connected to the circulating pump means for supplying additive from a bulk supply thereof to the circulating pump means, and means connected to the circulating pump means for receiving pressurized additive from the circulating pump means and for returning pressurized additive to the bulk supply thereof;
- an additive metering and injecting circuit comprising metering pump means, means connecting the metering pump means to the circulating pump means for receiving pressurized additive therefrom and means connected to the metering pump means and the supply line for receiving metered quantities of the additive from the metering pump means and injecting the metered quantities of additive into the supply line.

The additive circulating circuit acts as a pre-charging pressurizing circuit for supplying additive under pressure to the metering pump. It has been found that this technique maintains the volumetric efficiency of the metering pump at a substantially constant value for a wide range of additive viscosities and temperatures and over a wide range of pump speeds.

The metering pump is preferably a valveless rotating and reciprocating piston type pump such as the Fluid Metering Inc. CSC-Q2 metering pump.

Other features and objects of the present invention will become apparent as the following description proceeds.

BRIEF DESCRIPTION OF THE DRAWINGS

In the accompanying drawings, which illustrate exemplary embodiments of the present invention:

FIG. 5 is an elevation of FIG. 4;

FIG. 6 is a schematic plan of a power take-off driven system;

FIG. 7 is a schematic plan of an alternative power take-off driven system; and

DETAILED DESCRIPTION

Figure 1:
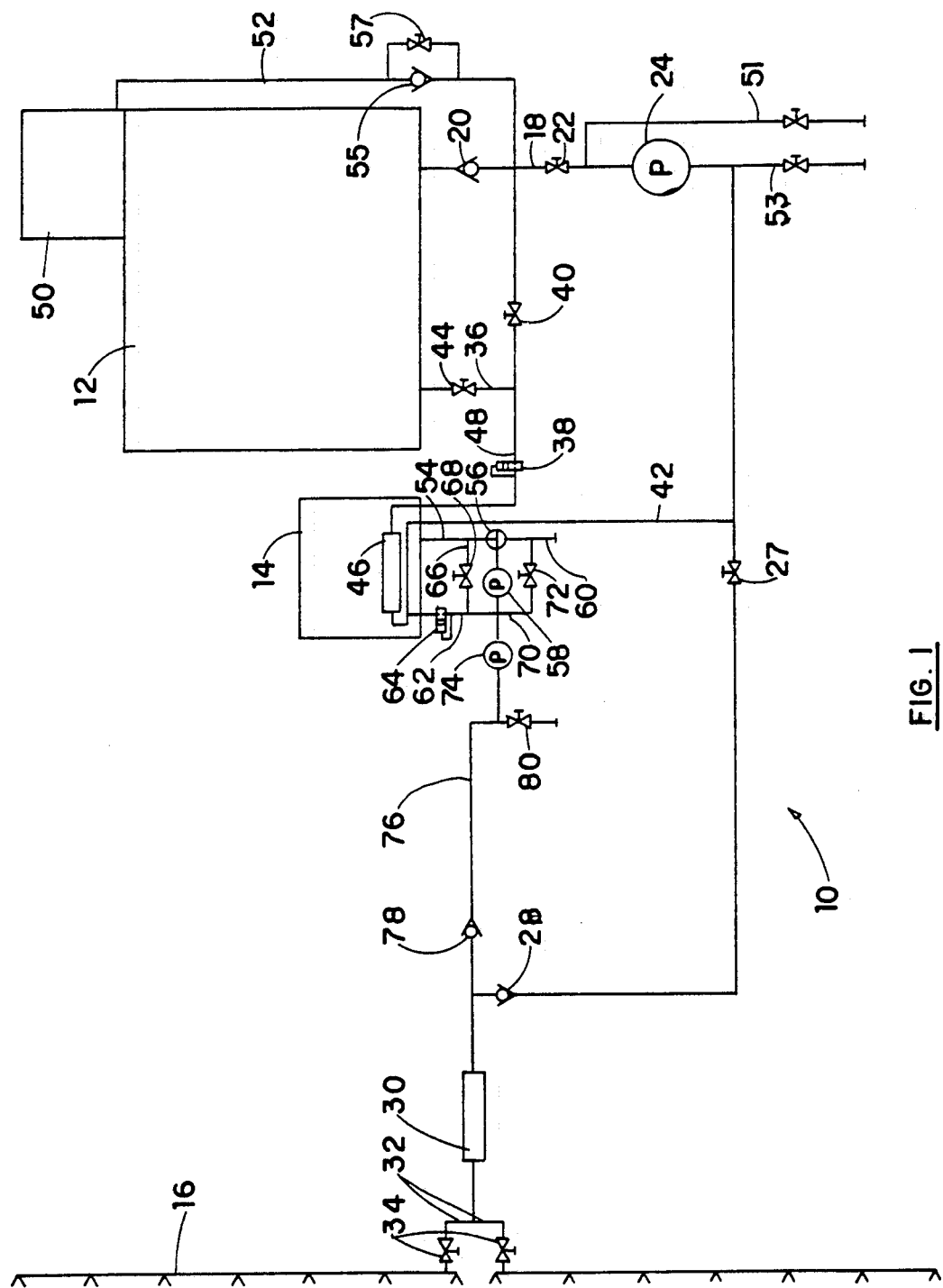
FIG. 1 is a schematic of an electrically driven injector system.

Referring to the accompanying drawings, and especially to FIG. 1, there is illustrated an agricultural sprayer system 10 that includes a water tank 12, an additive tank 14 and a spray boom 16 for spraying mixed water and additive from the tanks 12 and 14 respectively onto an agricultural field. The term "water" is used here for the sake of convenience. It is to be understood that carrier liquids generally can be contained in the tank 12 and mixed with the additive for spraying.

The water tank 12 has a water outlet line 18 equipped with a check valve 20 and a shut-off valve 22. This leads to a spray pump 24 discharging into a supply line 26. The supply line has a shut-off valve 27 and a check valve 28 preventing back-flow through the supply line near a static mixer 30. The outlet from the static mixer is shown as having two branches 32, each equipped with a shut-off valve 34. Each branch 32 is .cConnected to an independent section of the boom 16.

Opening the valve 44 in the agitation line provides an injection of water into the water tank 12 that can be used to agitate the contents of the water tank, which may be beneficial where the carrier liquid has a component that tends to settle out.

The supply line 26 is connected to a cooling water supply line 42 connected in turn to a cooling coil 46 in the additive tank 14. The discharge from the cooling coil passes through a discharge line 48 to the water outlet line 18 to be mixed with the water drawn from the tank 12.

The discharge line is also connected to an agitation line 36 leading back to the water tank to inject water for agitation where required. A pressure relief valve 38 is inserted in the drain line 48 upstream of the agitation line, while a shut-off valve 40 is inserted between the agitation and outlet lines. A shut-off valve 44 is included in the agitation line.

A rinse tank 50 is mounted on the water tank 12 and is connected to the water outlet line 18 between the .cCheck valve 20 and the shut-off valve 22 by a line 52 containing a check valve 55 for permitting water flow into the tank but not out. A shut-off valve is included in a line by passing the check valve. Two rinse lines 51 and 53 are connected to the outlet line 18 and the supply line 26 respectively on opposite sides of the pump 24.

The additive tank 14 is coupled to an additive outlet line 54. This leads to a three-way valve 56 also coupled to a circulating pump 58 and a fill and drain line 60. The circulating pump 58 discharges into a return line 62 containing a pressure relief valve 64. A by-pass line 66 connects the additive outlet line 54 to the return line upstream of the pressure relief valve 64. A shut-off valve 68 is included in the by-pass 66. A second by-pass line 70 connects the fill and drain line 60 to the outlet of the circulating pump 58, in direct communication with by-pass 66. A shut-off valve 72 is included in the by-pass line 70.

A metering injector pump 74 is connected to the outlet of the circulating pump 58. It discharges into an additive injection line 76 leading to the supply line 26 just upstream of the static mixer 30. The injector line includes a check valve 78 and a purging tap 80.

In normal operation of this injector system, the three-way valve 56 connects the outlet line 54 to the circulating pump 58 and the shut-off valves 68 and 72 are closed. Operation of the pump generates a circulating flow of fluid additive from the additive tank 14, through the outlet line 54, the pump 58 and the return line 62. Between the pump and the return line, pressure is maintained at a uniform level by the relief valve 64.

The metering and injector pump 74 is, in the preferred embodiment, a CSC-Q2 from Fluid Metering Inc. This pump has a variable stroke that is normally used to control flow rate. It has been found that a pump of this sort is not normally useable in injecting agricultural chemicals for a number of reasons. These include an inability to vary the stroke length according to the ground speed of the sprayer, something that is important to ensure uniform application of the chemical additive. It has also been found that the volumetric efficiency varies with pump speed, especially with high viscosity chemicals, so that simply varying the speed of the pump with the ground speed of the sprayer is insufficient. The applicant has now discovered however, that using the circulating pump 58 and pressure relief valve 64 as an inlet pressurizing system for the metering pump overcomes these problems by producing a substantially constant volumetric efficiency over the necessary operating range of speeds of the pump. The stroke length can then be adjusted to provide the desired application rate, with the pump output controlled according to sprayer ground speed. It has been found that with a fuel pump stroke, at a pump speed of 1,800 r.p.m., an inlet pressure of 10 p.s.i. is appropriate for proper pump operation. For operation of the pump at 2,800 r.p.m., an inlet pressure of 30 p.s.i. is desired to pump the most viscous agricultural chemicals, for example Buctril M(TM).

The injection circuit illustrated in FIG. 1 also includes an optional power fill and drain system, which includes the by-passes 66 and 70, and the fill and drain line 60.

To fill the additive tank 14 with a liquid additive, the line 60 is connected to the supply of additive, the three-way valve is arranged to connect the fill and drain line 60 to the pump 58. The shut-off valve 72 remains closed, while the shut-off valve 68 in by-pass 66 is opened. Operation of the pump 58 then draws additive through the line 60 to the pump 58, which pumps it through the by-pass 66 into the additive tank.

To drain the tank, the three-way valve 56 connects the outlet line 54 to the pump 58, the shut-off valve 68 is closed, and the shut-off valve 72 is open. Operation of the pump then draws additive through the outlet line 54 and the valve 56 to the pump for delivery through the by-pass 70 to the fill and drain line 60. A similar arrangement, with the pump 58 shut off is used for purging the system.

For testing the system or mixing chemicals in the additive tank, both shut-off valves 68 and 72 are closed, the three-way valve 56 connects the outlet line 54 to the pump 58 and the pump is operated. For this purpose and to provide a more rapid power filling and emptying, the pump 58 may have two speeds, a high speed for filling, emptying and mixing and a lower speed for normal injection operation.

The lines 51 and 53 are used in conjunction with the rinse tank 50 for rinsing empty additive containers. The valve in the line 53 is opened, the valve 27 is closed and valve 40 is closed, and valve 22 is partially closed. Water is drawn from the tank and is pumped partially through line 53 to the container. For return through line 51 to the inlet of pump 24, the valve in line 53 is closed and that in line 51 opened. Valve 40 is also opened. The remainder of the pump discharge is through lines 26, 42 and 48 to line 52, through which excess rinse water is fed to rinse tank 50, which acts as a holding tank. When spraying is commenced, the valve 57 is opened to allow the water from tank 50 to pass through the spray pump to the booms. The rinse tank is used only when there is no agitation in water tank 12.

In the embodiment of FIG. 1, the system is intended to be driven electrically, with electric control of the pumps 24, 58 and 74. Coupled with an effective ground speed monitor and an appropriate control system, very accurate injection of a wide range of additives with varying physical properties can be achieved.

Figure 2:
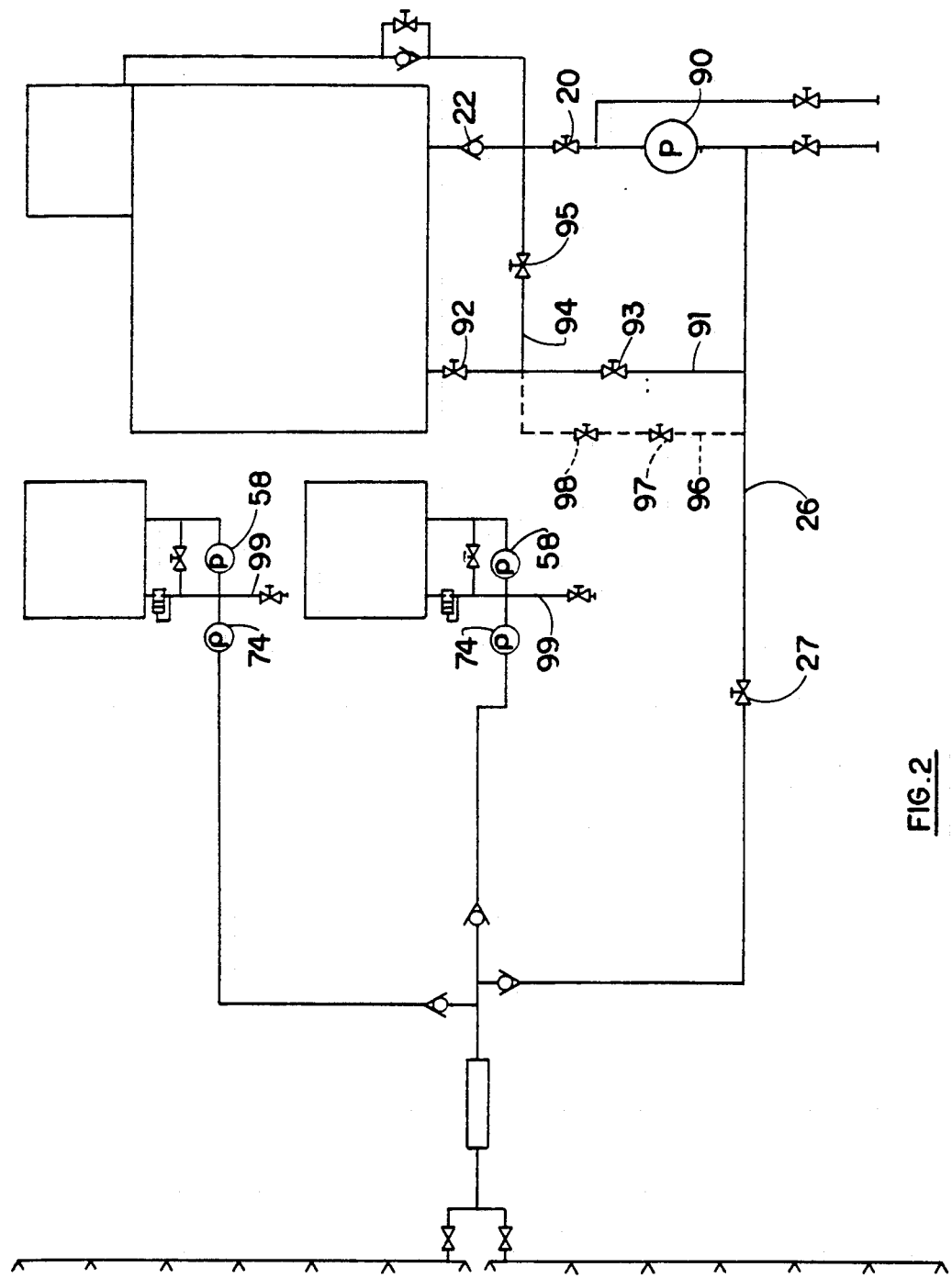
FIG. 2 is a schematic of a mechanically driven injector system.

FIG. 2 of the drawings illustrates an alternative mechanically driven spraying system. In this system, the water outlet line 18 is connected to the inlet of a centrifugal spray pump 90. A return line 91 is connected between the pump outlet and the water tank. It contains a shut-off valve 92 and a variable restrictor 93. A by-pass line 94 extends from the return line 91 to the outlet line 18 between check valve 22 and valve 20. The by-pass line contains a valve 95. An optional circuit 96 by-passing the variable restrictor 93. This contains a shut-off valve 97 and a second variable restrictor 98.

In normal operation, the valves 92 and 97 (where used) are shut. Valves 20 and 95 are open. The restrictor 93 is adjusted to provide the desired flow volume through line 26 at a given pump speed. This proportions the flows between supply line 26 and by-pass 94. The ratio of the flows remains constant regardless of pump speed. Total volume delivered varies in direct proportion to the pump speed. With a ground driven or power take-off driven pump, the pump speed varies with ground speed so that water volume delivered to the spray booms will be proportional to the ground speed, as desired.

In a system of this sort the spray nozzles should be capable of operating at a wide range of supply rates. Nozzles of this sort are commercially available.

The injector system illustrated in FIG. 2 is a gravity fill and drain system in which the three-way valve 56 and the by-pass lines 70 are omitted. A drain line 99 is connected to the line joining the outlet of the pump 58 to the inlet of pump 74 for gravity drain purposes. Two injectors are included, to provide for spot spraying of a second additive.

Figure 3:
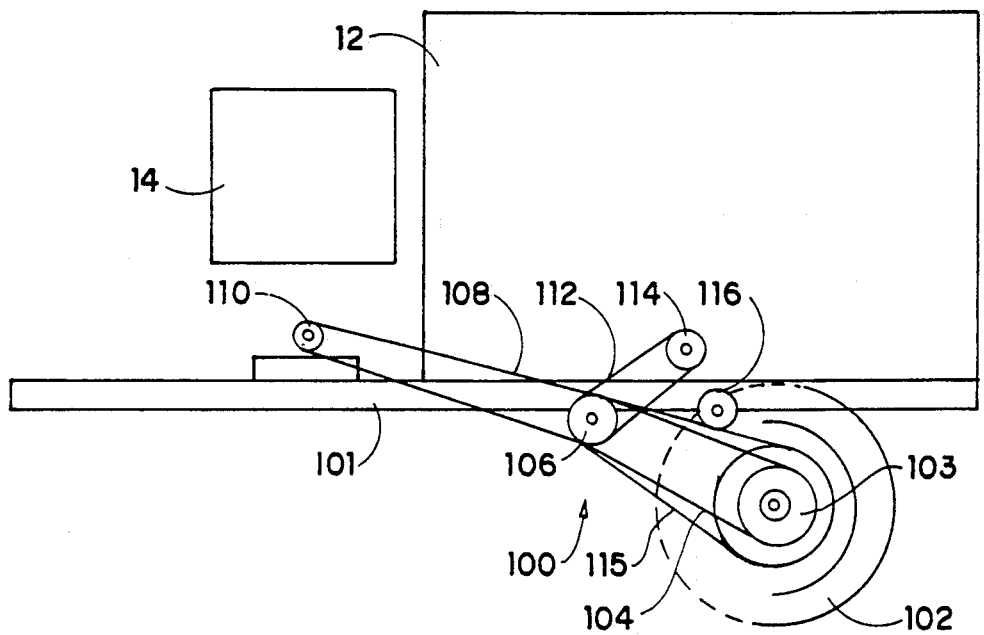
FIG. 3 is a schematic side elevation of a ground driven injector system.

FIG. 3 is side elevation of a ground drive system 100. The sprayer frame 101 is supported on wheels 102 (one shown) to travel over a field. The wheel 102 is connected to a sprocket 103 engaged with a chain 104 that also runs over an idler 106 mounted on the frame 100. The idler is mounted on a common shaft with two additional idlers, one of which is engaged with a chain 108 driving a sprocket 110 coupled to the pumps 58 and 74 of the injector system. A second chain 112 drives a sprocket 114 in turn connected to the spray pump 90. The drive for chain 104 may include a one-way clutch, and the chain may be paralleled by a V-belt drive 115 that is normally disengaged and may be engaged by a solenoid actuated idler 116. The V-belt drive provides an increased pump speed for heavier spot spraying.

Figure 4:
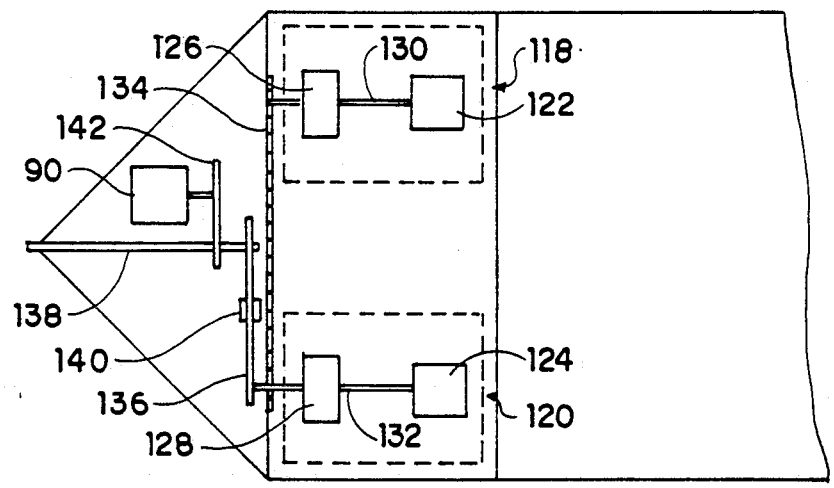
FIG. 4 is a plan view of the ground driven system showing the pum layout.

Referring to FIG. 4, there is illustrated a plan view of a power take-off driven spray system where two injectors 118 and 120 are mounted on the sprayer in front of the water tank 12. The injectors include circulation pumps 122 and 124 respectively and metering pumps 126 and 128 respectively. The pumps of the two injectors are driven from drive shafts 130 and 132, with the two drive shafts being linked by a chain drive 134. The shaft 132 is driven by a belt drive 136 from a power take-off shaft 138. The belt drive is normally disengaged and can be engaged by a solenoid driven belt tightener 140. A chain drive 142 connects the power take-off shaft 138 to the spray pump 90.

FIG. 5 illustrates an alternative injector drive, where the circulating pumps may be driven at two different speeds, according to the functions being performed, as discussed above. The two pumps are linked by a chain drive 146 to operate at the same speed. The chain drive is in turn driven by a two speed belt drive 148 from a power take-off shaft 150. A belt drive 152 connects the power take-off shaft to a metering pump drive shaft 154 which drives one of the metering pumps directly and is connected to the other through a chain drive 156.

FIGS. 6 and 7 illustrate a particularly advantageous layout for the pumps of the injector system. These are located beneath the additive tank 14. In the illustrated embodiment, they are driven by a shaft 158 that extends transversely of the sprayer and carries a sprocket 160 at its outer end for engagement with a ground driven chain. The inner end of the shaft 158 carries a sprocket 160 engaged with a chain 164 that drives a sprocket 166 on a drive shaft for two metering injector pumps 74. A second sprocket 167 on the shaft 158 drives a sprocket 168 on the drive shaft of the circulation pump 58 through a chain 170. With this arrangement, the metering and injector pumps are accessible from the front of the sprayer, simply by removing a single cover plate. The pumps are therefore readily accessible for adjustment and servicing as necessary. Similarly, the circulating pump 58 is accessible from the side of the sprayer and is oriented so that the part of the pump that may require service is readily accessible.

Figure 8:
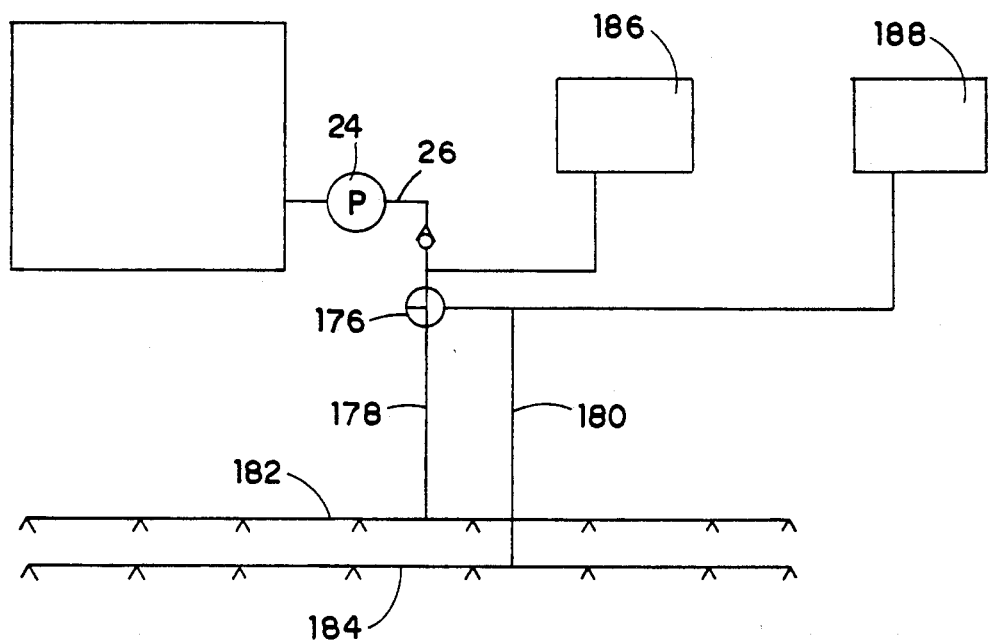
FIG. 8 is a schematic of a spot spraying system.

FIG. 8 is a schematic view of a spot spraying system in which the supply line 26 from the water pump 24 is connected to a three-way valve 176. The valve is also connected to two lines 178 and 180 that serve as supply lines to two spray booms 182 and 184. This system incorporates two injectors 186 and 188. Injector 186 is connected to the supply line upstream of the three-way valve 176, while the injector 188 is connected to the line 180. With this arrangement, the three-way valve 176 normally connects the supply line 26 to the line 178 leading to boom 182. This provides a spray of the additive from injector 186. Where spot spraying of the additive from injector 188 in combination with the additive from injector 186 is required, the three-way valve is operated to connect the supply line 26 to the line 80, so that both additives are injected into line 180 to be sprayed together through boom 184. The use of the second boom eliminates any lag time between initiation of spot spraying and the additive actually reaching the spray nozzles. The boom 184 is already supplied with the desired materials, and simply turning it on provdes an instantaneous spray of the desired materials.

While particular embodiments of the present invention have been described in the foregoing, it is to be understood that other embodiments are possible within the scope of the present invention. The invention is to be considered limited solely by the scope of the appended claims.

I claim:

1. A system for supplying measured quantities of fluid additive to a carrier liquid flow in an agricultural sprayer of the type having a carrier liquid tank, a spray boom assembly for spraying mixed carrier liquid and additive onto a field, a supply line leading from the carrier liquid tank to the boom and carrier pump means for pumping carrier liquid through the supply line, said system comprising:

an additive circulating circuit including circulating pump means, means connected to the circulating pump means for supplying additive from a bulk supply thereof to the circulating pump means, and means connected to the circulating pump means for receiving pressurized additive from the circulating pump means and for returning pressurized additive to the bulk supply thereof;

an additive metering and injecting circuit comprising metering pump means, means connecting the metering pump means to the circulating pump means for receiving pressurized additive therefrom and means connected to the metering pump means and the supply line for receiving metered quantities of the additive from the metering pump means and injecting the additive into the supply line.

2. A system according to claim 1 wherein:

the bulk supply of additive comprises an additive tank;

the circulating pump means comprise a circulating pump with an inlet and an outlet; and the additive circulating circuit includes a pressure relief valve means connected to the outlet of the circulating pump and to the additive tank;

and further including:

a fill and drain line;

a three-way valve connecting the circulating pump inlet to the additive tank and to the fill and drain line;

a first by-pass line including a first by-pass shut-off valve connecting the additive tank to the circulating pump outlet; and a second by-pass line including a second by-pass shut-off valve connecting the fill and drain line to the circulating pump outlet.

3. A system according to claim 1 wherein the carrier pump means comprise a spray pump with a spray pump inlet and a spray pump outlet, and including:

means connecting the spray pump inlet to the carrier liquid tank to receive carrier liquid therefrom;

a carrier liquid return circuit including a variable restrictor, a return line connecting the spray pump to the variable restrictor and connecting the variable restrictor to the spray pump inlet; and drive means for driving the spray pump including a ground wheel carrying the agricultural sprayer and means coupling the spray pump to the ground wheel for driving the spray pump in response to rotation of the ground wheel.

4. A system according to claim 3 including means connecting the circulating pump means and the metering pump means to the drive means for driving the circulating pump means and the metering pump means in response to rotation of the ground wheel.

* * * * *